(12) United States Patent
Brinkman et al.

(10) Patent No.: US 6,268,912 B1
(45) Date of Patent: *Jul. 31, 2001

(54) ANGLE DETECTION METHOD FOR BENDING MACHINE, ANGLE DETECTION APPARATUS AND ANGLE SENSOR

(75) Inventors: Gerben Jan Brinkman, Enschede (NL); Mitsuo Hiraizumi, Kanagawa (JP)

(73) Assignee: Amada Electronics Company, Ltd., Kanagawa (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/147,120
(22) PCT Filed: Feb. 12, 1997
(86) PCT No.: PCT/JP97/00361
  § 371 Date: Nov. 23, 1998
  § 102(e) Date: Nov. 23, 1998
(87) PCT Pub. No.: WO97/30327
  PCT Pub. Date: Aug. 21, 1997

(30) Foreign Application Priority Data

Feb. 13, 1996 (NL) .................................................. 1002314
Dec. 2, 1996 (JP) .................................................. 8-321813

(51) Int. Cl.⁷ .................................................... G01B 11/26
(52) U.S. Cl. .......................................................... 356/138
(58) Field of Search .................................. 356/375, 398, 356/376, 394, 138; 250/559.37, 559.08; 72/37, 389.3, 16.4

(56) References Cited

U.S. PATENT DOCUMENTS

| 4,063,819 | 12/1977 | Hayes . |
| 4,425,043 | * 1/1984 | Van Rosmalen ...................... 356/376 |
| 4,564,765 | * 1/1986 | Blaich .................................. 250/561 |

FOREIGN PATENT DOCUMENTS

| 19510075 | 8/1995 | (DE) . |
| 0063830 | 11/1982 | (EP) . |

(List continued on next page.)

OTHER PUBLICATIONS

An English Language abstract of JP 1–199104.

(List continued on next page.)

Primary Examiner—Frank G. Font
Assistant Examiner—Tu T. Nguyen
(74) Attorney, Agent, or Firm—Greenblum & Bernstein P.L.C.

(57) ABSTRACT

An angle detection method for a bending machines for detecting a bending angle of a bent workpiece and an angle detection apparatus and an angle sensor thereof are provided. A detection light is emitted toward a workpiece W from a light source 9 while the angle sensor 3 is rotated in the forward and reverse directions. A plurality of optical sensors 11, 13 arranged at mutually symmetrical positions with the light source 9 being at the center thereof receive the reflection light from the measurement object W. The quantity of received light is stored in relation to the rotation angle of the angle sensor 3 detected by an rotation angle detector 33. A angle calculation portion 35 calculates the angle of the measurement object W based on the peak values of the data of the quantity of the received light and the rotation angles of the angle sensor 3 corresponding to the peak values. Alternatively, the rotation angle detector 3 detects the rotation angles of the angle sensor 3 at the time when the quantities of the received light received by the pair of optical sensors 11, 13 are the same, and the angle calculation portion 33 calculates the angle of the measurement object W based on the rotation angles.

12 Claims, 11 Drawing Sheets

FOREIGN PATENT DOCUMENTS

| | | |
|---|---|---|
| 0470263 | 2/1992 | (EP) . |
| 2117511 | 2/1982 | (GB) . |
| 2156973 | 10/1985 | (GB) . |
| 2238382 | 5/1991 | (GB) . |
| 59-20924 | 2/1984 | (JP) . |
| 60-44806 | 3/1985 | (JP) . |
| 60-247415 | 12/1985 | (JP) . |
| 1-199104 | 8/1989 | (JP) . |
| 1199104 | 8/1989 | (JP) . |
| 7-171627 | 7/1995 | (JP) . |

OTHER PUBLICATIONS

An English Language abstract of JP 60–44806.

English Language Abstract of Japanese Utility Model Application No. 114696/1982 (Laid–Open No. 20924/1984).

English Langauge Abstract of JP–A–60–247415.

English Language Abstract of JP–A–1–199104.

English Language Abstract of JP–A–171627.

* cited by examiner- (A)

(B)

PRIOR ART

ANGLE DETECTION METHOD FOR BENDING MACHINE, ANGLE DETECTION APPARATUS AND ANGLE SENSOR

FIELD OF TECHNOLOGY

This invention relates to a method and apparatus, and to an angle sensor used in the apparatus, for detecting the bending angle of a plate-shaped workpiece bent by a bending processing machine such as a press brake for example.

BACKGROUND TECHNOLOGY

FIG. 13 shows one example structure from the prior art for detecting the bending angle 2 θ of a measurement object comprised of a workpiece W which has undergone a bending process in cooperation with a punch P and a die D equipped in a press brake (omitted from the drawings), wherein an upward bend angle 2 θ is determined by raising or lowering a detection element 101 to bring the tip of the detection element 101 into contact with a lower surface of the workpiece W, with this value then being doubled to determine the bending angle 2 θ.

In the above-described structure of an angle detection apparatus 103, an ascension/descension device 107 such as a cylinder is provided on a die base 105 equipped with a die D, and by means of this ascension/descension device 107 the detection element 101 is raised in an upward direction in FIG. 13 to be brought into contact with a lower surface of the workpiece W. The raised position of the detection element at this time can be measured, for example, by a pulse encoder 113 connected to a pinion gear 111 which meshes with a rack 109 arranged to move up and down together with the detection element 101, whereby a structure is formed for detecting the bending angle 2 θ.

Further, a process for detecting the bending angle of the workpiece may be carried out by imaging an edge surface of the bent up workpiece with a non-contact imaging means and then processing such imaged data with a image processing.

Furthermore, there is another angle measurement apparatus, in which a rotatable frame equipped with a light source and a converging lens is provided, and in which a plurality of light-receiving elements are arranged in the shape of a circular arc at a location corresponding to the focus position of the converging lens, whereby reflected light of the light which emitted toward the workpiece from the light source is focused by the converging lens toward the position of the light-receiving elements arranged in the shape of the circular arc, whereby the position of the light-receiving elements where the received light is a maximum is detected in order to detect the bending angle of the workpiece.

However, there is a problem with regards to these types of prior art technology in that highly accurate angle detection is difficult because the bending angle is determined from the relationship between the position of the die D and the position of the workpiece W determined by measuring the position of the detection element 101 in contact with the workpiece W.

Further, because angle detection is carried out by bringing the detection element 101 into contact with the workpiece W, deformation of the workpiece W will arise depending on the strength of contact with the detection element, and this risk of changes arising in the bending angle creates a problem.

Further, in the case where an image processing device is used, because the apparatus is a non-contact type, there is no risk of changes arising due to contact, but high costs and the ability to only measure an edge surface of the workpiece creates problems.

In the structure having a plurality of light-receiving elements arranged in a circular arc shape at positions corresponding to the focus of the rotating converging lens, because accurate measurements are difficult if the light-receiving elements are shifted even a small amount from the focus position of the converging lens, there is a need for high precision in the apparatus and this creates problems.

In view of the problems of the prior art described above, it is an object of the present invention to provide an angle detection method for bending machines, an angle detection apparatus and an angle sensor which make it possible to carry out highly accurate angle detection by detecting the angle of a bent workpiece without making contact with the surface of the workpiece.

DISCLOSURE OF THE INVENTION

In order to achieve the object stated above, in the angle detection method for bending machines according to the invention of claim 1, detection light is emitted toward a measurement object from a light source provided in an angle sensor equipped with a plurality of optical sensors arranged at mutually opposite positions with the light source therebetween, the angle sensor is rotated in the forward and reverse directions within the plane where the light source and optical sensors are arranged, and the angle of the measurement object is detected based on the rotation angle of the angle sensor at the time when the quantity of light received by one of the optical sensors is a maximum and the rotation angle of the angle sensor at the time when the quantity of light received by the other optical sensor is a maximum.

Accordingly, detection light emitted from the light source of the rotating angle sensor impinges onto the measurement object and the reflected light therefrom is received by the plurality of optical sensors positioned on opposite sides with the light source therebetween, and the angle of the measurement object is measured from the angles of ) the angle sensor at the positions where the quantity of light received by each of the optical sensors forms a peak. That is, in an example structure where the optical sensors are positioned symmetrically at equal distances from the light source, the angle of the detection object can be detected from the fact that the detection light impinges onto perpendicular to the detection object at an intermediate rotation angle position of the angle sensor between the positions where the quantity of light received by each of the optical sensors is a maximum.

In the angle detection method for bending machines according to the invention of claim 2, detection light is emitted toward a measurement object from a light source provided in an angle sensor equipped with at least one pair of optical sensors arranged at symmetrical positions with the light source centered therebetween, the angle sensor is rotated in the forward and reverse directions within the plane where the light source and optical sensors are arranged, and the angle of the measurement object is detected based on the rotation angles of the angle sensor from a reference position when the quantities of light received by the pair optical sensors are the same.

Accordingly, detection light emitted from the light source of the rotating angle sensor strikes the measurement object and the reflected light therefrom is received by the pair of optical sensors symmetrically positioned at equally distances from the light source, and the angle of the measurement object is measured from the rotation angle of the angle sensor at the time when the quantities of light received by the pair of optical sensors are the same. That is, the angle of the detection object is detected from the fact that the detection light from the light source is incident perpendicular on the detection object when the same quantity of light is received by each of the optical sensors arranged symmetrically at equal distances from the light source.

In the angle detection apparatus according to the invention of claim 3, the apparatus includes an angle sensor equipped with a light source for emitting detection light toward a measurement object and a plurality of optical sensors for receiving reflected light from the measurement object, the optical sensors being located at mutually opposite positions with the light source arranged therebetween, and the angle sensor being rotatable in forward and reverse directions in the plane where the light source and the optical sensors are arranged; a rotation angle detector for detecting the rotation angle of the angle sensor with respect to a prescribed reference position; a peak value detection portion for detecting the peak value of the reflected light received by the optical sensors; and an angle calculation portion for calculating the angle of the measurement object based on those rotation angles of the angle sensor detected by the rotation angle detector which should correspond to the peak values detected by the peak value detection portion.

Accordingly, detection light is emitted toward the measurement object from the light source while the angle sensor is rotated in the forward and reverse directions, and the light reflected from the measurement object is received by the plurality of optical sensors provided at symmetrical positions with respect to the light source. The quantity of light received at this time is synchronized with the rotation angle of the angle sensor detected by the rotation angle detector and held for future use, and based on the data of this quantity of received light, the peak value detection portion detects the peak value of the quantity of received light. Then, the rotation angles of the angle sensor corresponding to the peak values of each optical sensor are detected by the rotation angle detector, and the angle calculation portion performs calculations based on these rotation angles to determine the angle of the measurement object.

In the angle detection apparatus according to the invention of claim 4, the apparatus includes an angle sensor equipped with a light source for emitting detection light toward a measurement object and at least one pair of sensors for receiving reflected light from the measurement object, the pair of sensors being located at symmetrical positions with the light source arranged in the center, and the angle sensor being rotatable in forward and reverse directions in the plane where the light source and each of the sensors are arranged; a rotation angle detector for detecting the rotation angle of the angle sensor with respect to a prescribed reference position; and an angle calculation portion for calculating the angle of the measurement object based on the rotation angle of the angle sensor detected by the rotation angle detector when the quantities of the reflected light received by each of the pair of sensors are equal to each other.

Accordingly, detection light is emitted toward the measurement object from the light source while the angle sensor is rotated in the forward and reverse directions, and the light reflected from the measurement object is received by the at least one pair of optical sensors provided at symmetrical positions with respect to the light source. Then the rotation angle detector detects the rotation angle of the angle sensor at the time when the quantities of light received by the pair of optical sensors are the same, and based on this rotation angle the angle calculation portion detects the angle of the measurement object.

In the invention according to claim 5, the angle sensor in the angle detection apparatus stated in claim 3 or 4 is provided so as to be position adjustable in a direction orthogonal to the bending line of the measurement object.

Accordingly, the angle sensor can be positioned at that optimum position with respect to the final bending angle of the measurement object (workpiece), and the bending angle can be detected by such angle sensor.

In the invention according to claim 6, the angle sensor in the angle detection apparatus stated in claim 3, 4 or 5 is provided so as to be position adjustable in a direction parallel to the bending line of the measurement object.

Accordingly, even in the case where the length of the bending line of the measurement object changes, it is possible to position the angle sensor at positions such as both left and right edge portions and the center portion of the measurement portion, and this makes it possible to detect the bending angle at a plurality of locations of the measurement portion.

In the invention according to claim 7, an angle sensor includes a light source for emitting detection light toward a measurement object, and a plurality of optical sensors for receiving reflected light from the measurement object, with the optical sensors being located at mutually opposite positions with the light source arranged therebetween.

Accordingly, the reflected light of the detection light emitted toward the measurement object from the light source can be simultaneously detected with the plurality of optical sensors, and by rotating the angle sensor in the forward and reverse directions, it becomes possible to detect the positions where the quantity of light received by each of the optical sensors is a maximum.

In the angle detection method for bending machines according to the invention of claim 8, detection light is emitted toward a detection object from a light source provided in an angle sensor, which simultaneously emits detection light and receives reflected light, while the angle sensor is rotated around a rotation axis parallel to the bending line of the detection object; the maximum quantity of received light of the reflected light from the detection object and the rotation angle of the angle sensor at that time are calculated; and the angle of the detection object is detected from the rotation angle at that time.

Accordingly, as soon as the detection light from the rotating angle sensor is emitted toward the detection object, reflected light from the detection object is received along the same axis, and this makes it possible to calculate the angle of the detection object from the rotation angle of the angle sensor when the quantity of received light is a maximum.

In the angle detection apparatus according to the invention of claim 9, the apparatus includes an angle sensor equipped with a light source for emitting detection light toward a detection object and an optical sensor for receiving reflected light from the detection object, the angle sensor being rotatable around a rotation axis parallel to the bending line of the detection object; a rotation angle detector for detecting the rotation angle of the angle sensor with respect to a prescribed reference position; a maximum received light quantity detection portion for detecting the maximum received light quantity of the reflected light received by the optical sensor; a maximum received light quantity angle detection portion for detecting the rotation angle of the angle sensor at the time when the maximum received light quantity is obtained by the maximum received light quantity detection portion; and an angle calculation portion for calculating the angle of the detection object from the rotation angle obtained by the maximum received light quantity angle detection portion.

Accordingly, detection light from the light source is emitted toward the detection object while the angle sensor is being rotated, and at the same time, the optical sensor positioned on the same axis receives reflected light from the detection object. The maximum of this quantity of received light is detected by the maximum received light detection portion, and when the maximum received light is detected, the rotation angle of the angle sensor at that time is detected by the maximum received light quantity angle detection portion. Then, the angle calculation portion determines the angle of the detection object by performing calculations based on the obtained rotation angle of the angle sensor.

BEST MODE FOR CARRYING OUT THE INVENTION

Hereinbelow, examples of preferred embodiments of the invention will be described based on the drawings. Now, because the angle detection method for bending machines and the angle detection apparatus and angle sensor thereof according to the present invention are applied to a commonly used processing machine such as a press brake for example, a detailed description of such a processing machine will be omitted.

Figure 3:
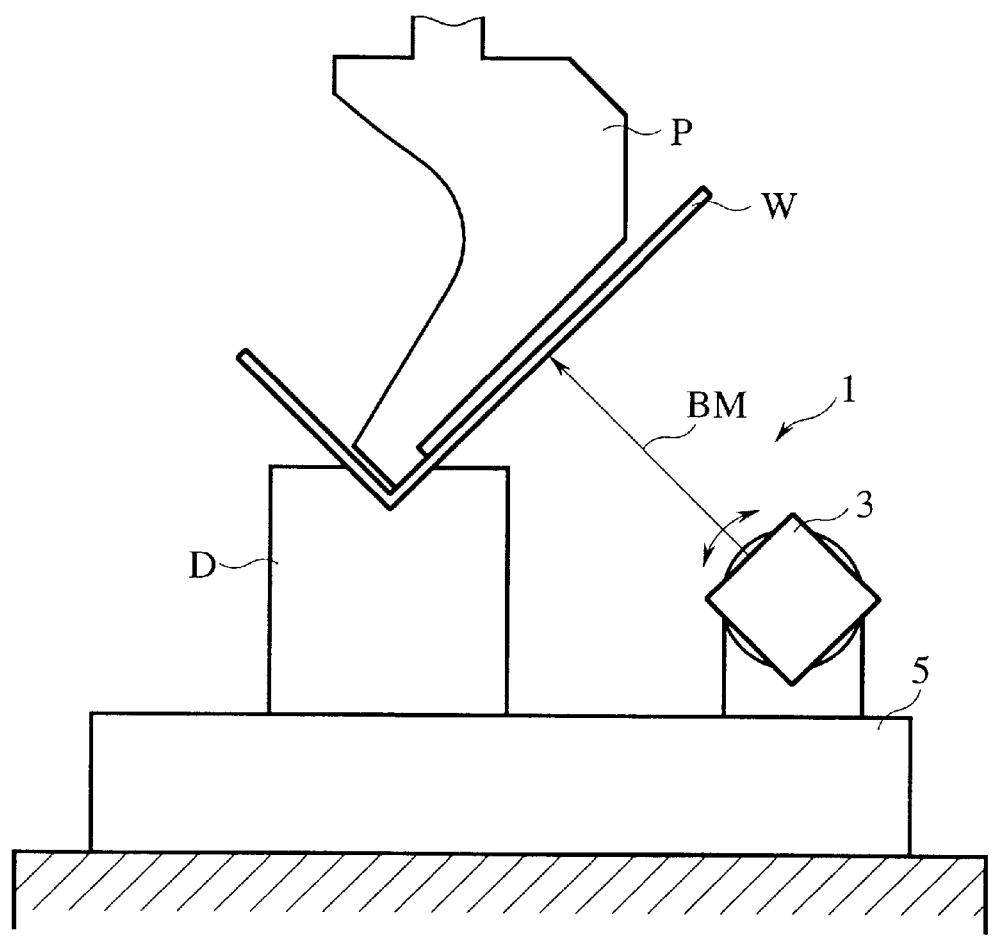
FIG. 3 is a side view showing the structure and operation of a sensor head.

FIG. 3 shows a sensor head 3 which serves as an angle sensor in an angle detection apparatus 1 for bending machines according to the present invention. In FIG. 3, the sensor head 3 is provided on top of a die base 5 for mounting a die D which carries out a bending process on a workpiece W which is the measurement object, in cooperation with a punch P. By means of a rotational drive unit (omitted from the drawings) such as a pulse motor for example, the sensor head 3 is provided so as to be freely rotatable around a rotation axis RC (see FIG. 6) which is parallel to the lengthwise direction of the die D and punch P, namely, the bending line of the workpiece W. Further, the sensor head 3 is provided so as to be freely movable in the bending line direction (the direction normal to the plane of FIG. 3) by means of a moving device omitted from the drawings.

As shown in FIGS. 4(A) and (B), a light projector 9 comprised of a light source which emits a laser beam BM as detection light along a direction orthogonal (vertical direction) to a front surface 7 of the sensor head 3 is provided in the center of the front surface 7. Further, a first light receiver 11 and a second light receiver 13 comprised of optical sensors are provided on the front surface 7 of the sensor head 3 at equally distant positions from the light projector 9 so that the light projector 9 is interposed therebetween.

That is to say, the light source 9 and the plurality of optical sensors 11, 13 are arranged in the same plane which includes the optical axis of the laser beam BM emitted from the light source 9, and the sensor head 3 is provided so as to be rotatable in this plane.

In the present embodiment, even though the optical sensors 11, 13 were provided at equally distant symmetrical positions with the light source 9 in between, the optical sensors 11, 13 are not necessarily limited to symmetrical positions, and if they are positioned at mutually opposite positions with the light source 9 in between, with the distance from the light source 9 to the each of the optical sensors 11, 13 being known in advance, each of optical sensors 11, 13 can be utilized to detect the bending angle of the workpiece W.

Figure 6:
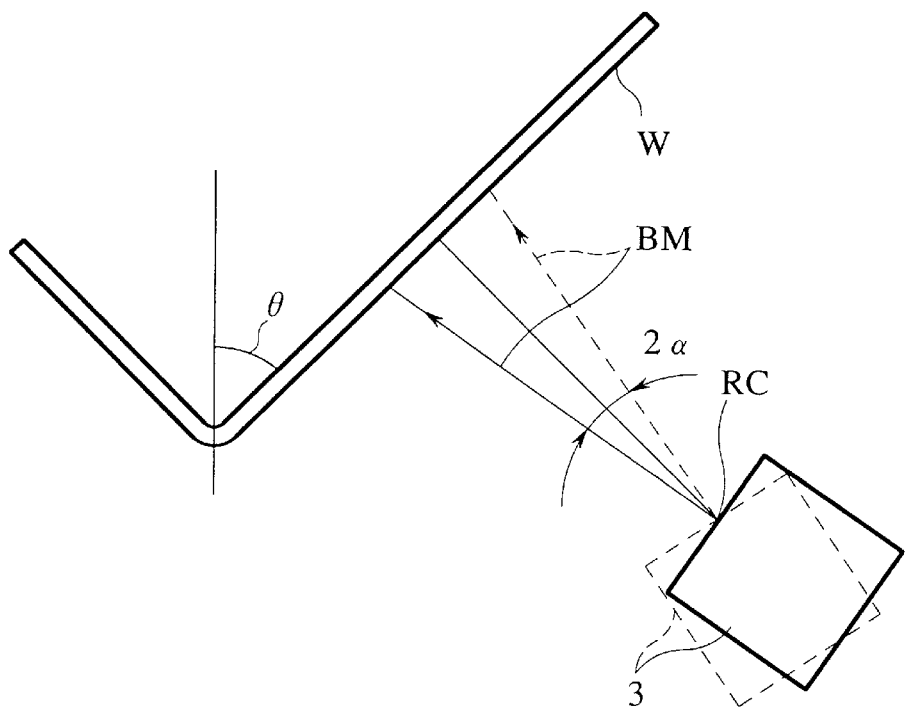
FIG. 6 is an explanatory drawing showing the operation of the sensor head in the angle detection apparatus.

With FIG. 6 also used as reference, it can be seen that the rotation axis RC intersects with and is orthogonal to the optical axis of the laser beam BM emitted from the light projector 9, and this laser beam BM axis is provided so as to be perpendicular to the plane that includes the light projector 9, the first light receiver 11 and the second light receiver 13. Also, the sensor head 3 is rotated around this rotation axis RC by means of a drive unit omitted from the drawings.

Next, with reference to FIG. 1, a description will be given for the structure which functions as the control system of the angle detection apparatus 1 for bending machines. The first light receiver 11 and the second light receiver 13 are connected to a light receiver change-over switch 19 respectively through preamplifiers 15 and 17, and received light signals from the first light receiver 11 or the second light receiver 13 are selected by means of this light receiver change-over switch 19. Then, after this selected reception signal is sent through a band pass filter 21, with only a prescribed frequency width signal passing therethrough, it is amplified by an amplifier 23 and inputted into a synchronous read circuit 25.

The synchronous read circuit 25 causes the received light data to be stored in a first received light data memory 27 or a second received light data memory 29 in synchronism with the projection of light of the laser beam BM from the light projector 9. And based on this received light data, a peak value detection portion 31 detects the peak value of the received light signal. Further, by calculating the rotation angle of the sensor head 3 with a rotation angle detector 33, an angle calculation portion 35 determines the bending angle of the workpiece W.

That is to say, when a signal indicating the completion of the bending process has been received from a control device which controls the bending processing machine such as a press brake, a measurement control portion 37 sends out a light receiver selection signal to the light receiver change-over switch 19 to select the first light receiver 11 or the second light receiver 13, and a one-step drive is carried out by rotating the sensor head 3 by a prescribed rotation angle, and a one-step drive completion signal is sent to the synchronous read circuit 25 so that the received light data sampling are synchronized with the rotation angle of the sensor head 3. The synchronous read circuit 25 is synchronized with a modulation signal of a modulator 39.

Figure 4:
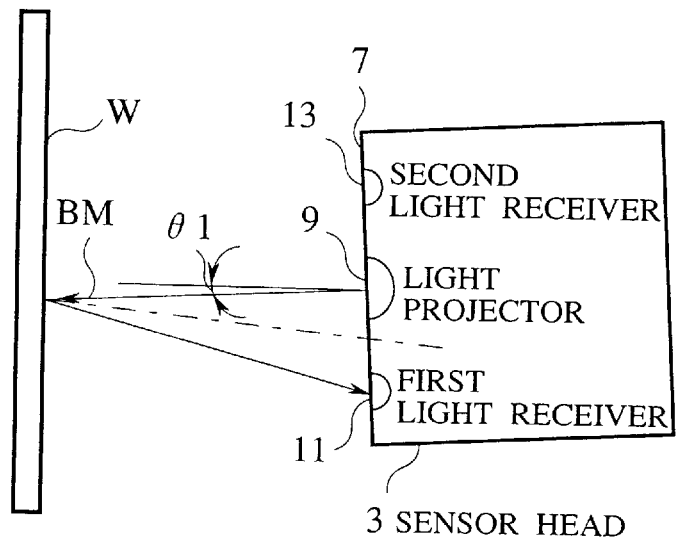
FIGS. 4(A) and 4(B) are explanatory drawings showing the motion of the detection light in the sensor head.
Figure 4:
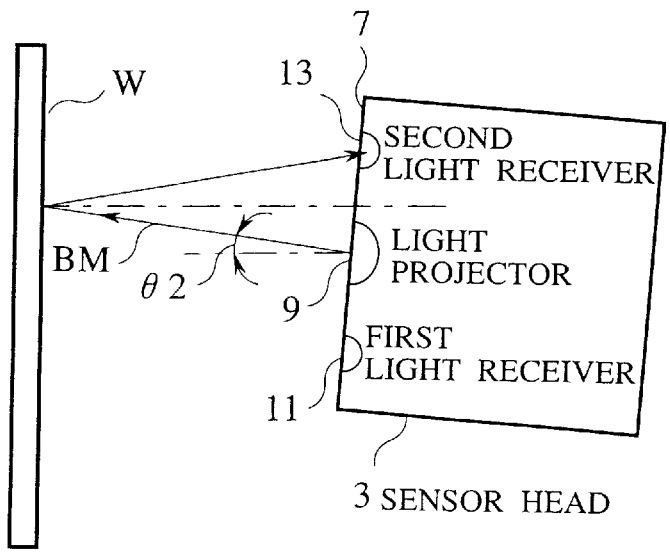

Next, with reference to FIG. 4 and FIG. 5, a description will be given for the principle of detecting the bending angle 2 θ of the workpiece W.

With reference to FIG. 4(A), when the sensor head 3 is rotated as shown in the drawing to a position where the rotation angle is θ 1, the laser beam BM impinging onto the surface of the workpiece W from the light projector 9 is reflected, and the first light receiver 11 receives a maximum amount of such reflected light. With reference to FIG. 4(B), when the sensor head 3 is moved in a similar manner to a position where the rotation angle is θ 2, the second light receiver 13 receives a maximum amount of such reflected light. Further, FIGS. 4(A) and (B) show the case where an angle of 0 degrees (namely, a horizontal state) forms the reference.

Figure 5:
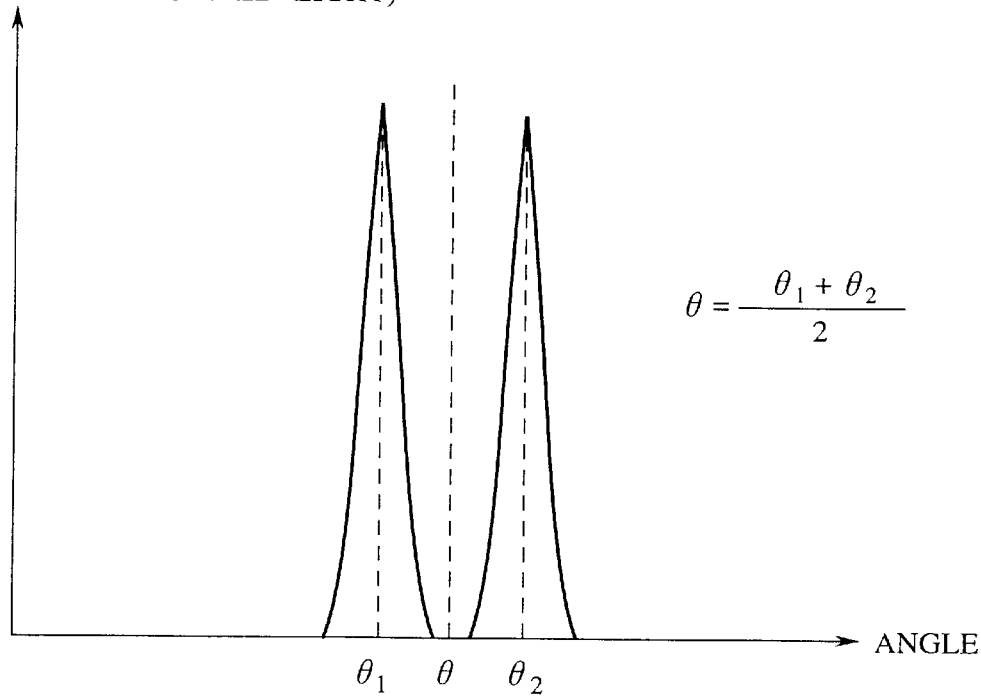
FIG. 5 is a graph showing the changes in the quantity of light received by light receivers for the rotation angles of the sensor head.

FIG. 5 shows the changes in the quantity of received reflected light that occur at this time with respect to the rotation angle of the sensor head 3, and in general the amount of reflected light received by the first light receiver 11 is a maximum when the tilt angle of the sensor head 3 is at θ 1 in the counter-clockwise direction with respect to a reference angle θ (where θ=0 degrees in the example shown in FIG. 4), and the amount of reflected light received by the second light receiver 13 is a maximum when the tilt angle of the sensor head 3 is at θ 2 in the clockwise direction with respect to the reference angle θ.

As described above, because the first light receiver 11 and the second light receiver 13 are provided at equal distances from the light projector 9, at an intermediate position in FIG. 5 between the rotation angle θ 1 measured from the horizontal position (i.e., θ=0), where the amount of light received by the first light receiver is a maximum, and the rotation angle θ 2 measured from the horizontal position, where the amount of light received by the second light receiver is a maximum, the laser beam BM is projected perpendicular with respect to the workpiece W which has undergone a bending process. In this way, the angle θ of the bent workpiece W can be obtained from $$\theta=(\theta1+\theta2)/2.$$

In this regard, θ 1 and θ 2 will be positive for the clockwise direction and negative for the counter-clockwise direction.

Next, with reference to FIGS. 1 and 6 as well as FIG. 2, a description will be given for a method of determining the bending angle of a workpiece W using the angle detection apparatus 1 described above.

First, when the angle detection operation is started (Step SS), during the bending process, the sensor head 3 is moved by a moving device (omitted from the drawings) along a direction parallel to the bending line to a measuring position (Step S1). In view of a target bending angle of 2 θ, the sensor head 3 is rotated by θ−α (see FIG. 6) around the rotation axis RC to prepare for angle detection operations (Step S2). In this regard, when setting a target bending angle θ, a spring back amount is taken into consideration so that the workpiece W is reliably set within the interval θ±α.

When the bending process is completed (Step S3), the measurement control portion 37 outputs a first light receiver selection signal to the light receiver change-over switch 19 to select the first light receiver 11 (Step S4). The sensor head 3 which is at the measurement starting angle position θ−α is rotated by a prescribed angle in the clockwise direction in one step by a rotational driving device (omitted from the drawings) (Step S5). At this time, a one-step driving completion signal is sent to the synchronous read circuit 25 from the measurement control portion 37, so that at the same time the sensor head 3 is being rotated, the amount of light received by the first light receiver 11 is measured and stored as data in the first received light data memory 27 (Step S6).

Until the rotation angle of the sensor head 3 reaches θ+α, the process is repeated from Step 5, and when the rotation angle reaches θ+α (Step S7), the measurement control portion 37 outputs a second light receiver selection signal to the light receiver change-over switch 19 to select the second light receiver 11 (Step S8). In this regard, the value of a is set in accordance with the distance between the light projector 9 and the first and second light receivers 11, 13 and the distance between the sensor head 3 and the workpiece W being measured, for example, at around 10 degrees.

The sensor head 3, which was rotationally moved to the position θ+α in order to carry out measurements with the first light receiver 11, is rotated by a prescribed angle in the counter-clockwise direction in one step by the rotational driving device (Step S9). At this time, a one-step driving completion signal is sent to the synchronous read circuit 25 from the measurement control portion 37, so that at the same time the sensor head 3 is being rotated, the amount of light received by the second light receiver 13 is measured and stored as data in the second received light data memory 29 (Step S10).

Until the rotation angle of the sensor head 3 reaches θ−α, the process is repeated from Step 9, and when the rotation angle reaches θ−α (Step S11), the peak value detection portion 31 retrieves the peak values of the quantity of light received by the first light receiver 11 from the data sequence stored in the first received light data memory 27 (Step S12). In a similar manner, the peak values of the quantity of light received by the second light receiver are retrieved from the data sequence stored in the second received light data memory 29 (Step S13).

From the angle θ 1 of the sensor head 3 which corresponds to the peak value of the first light receiver 11 and the angle θ 2 of the sensor head 3 which corresponds to the peak value of the second light receiver 13 obtained in this way, the angle calculation portion 35 calculates the bending angle θ of the workpiece W (Step S14), and then the angle detection operation is completed (Step SE).

The present invention is not limited to the embodiment described above, and by carrying out appropriate modifications, the present invention can be executed in other ways. That is to say, in the embodiment described above, although the sensor head 3 was provided on top of the die base 5 so as to be movable in the direction of the bending line and rotatable, it is also possible to mount the sensor head 3 on the head of the press brake so as to be movable in the up and down direction and the front and back direction. In this way, it is possible to measure a wider range of bending angles.

Figure 7:
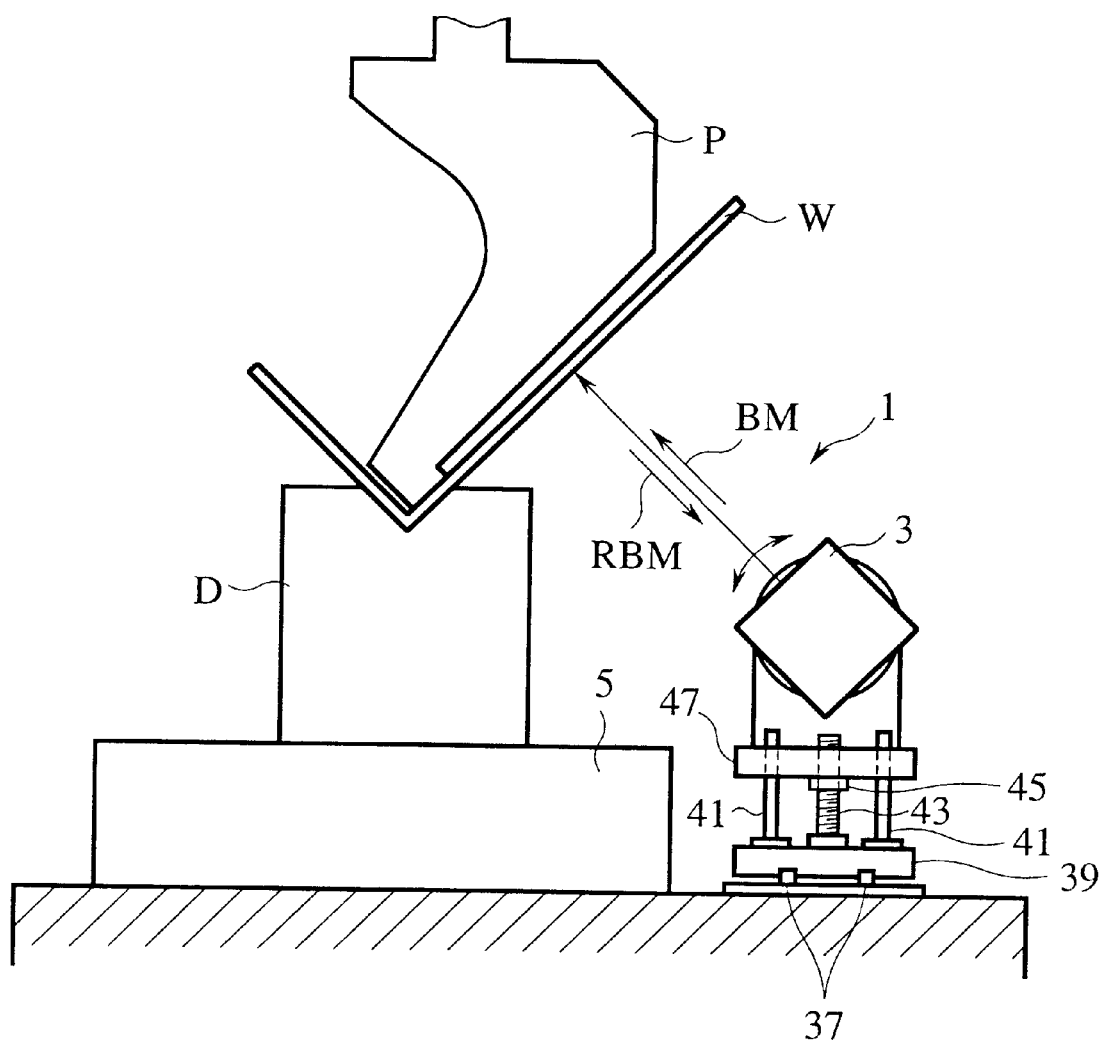
FIG. 7 is an explanatory drawing showing a second embodiment of the sensor head portion in the angle detection apparatus.

That is to say, as shown in FIG. 7, by providing the die base 5 or a position nearby with a guide portion 37 which runs parallel to the bending line of the workpiece W, by arranging a movement positioning member 39, equipped with a plurality of vertically erect guide rods 41 and an erect screw 43, to be movable along the guide portion 37, and by providing a support member 47, which supports the sensor head 3, with a rotatable nut member 45 screwed onto the screw 43 so as to be movable in the up and down direction, it becomes possible to construct an apparatus which can adjust the position of the sensor head 3 in the up and down direction, and this makes it possible to carry out a detection of the bending angle of the workpiece W with the sensor head 3 positioned at an optimum height position with respect to the bending angle of the workpiece W.

Further, in the description stated above, although the bending angle of the workpiece W was detected by calculating the intermediate position between the rotational position of the sensor head 3 when the quantity of light received by the first light receiver 11 shows a peak value and the rotational position of the sensor head 3 when the quantity of light received by the second light receiver 13 shows a peak value, by detecting the rotational position of the sensor head 13 when the quantities of light received by the first and second light receivers 11, 13 are the same as each other, it is possible to detect the bending angle of the workpiece W based on this rotational position.

A structure for the case stated above can be easily constructed by arranging the first and second light receivers 11, 13 to measure the reflected light from the laser beam impinging onto the workpiece W, by providing a comparison means which carries out a comparison to determine whether or not the detection values of the first and second light receivers 11, 13 are the same, and by driving a motor in the forward or reverse direction until the comparison results of the comparison means indicate equal detection values.

FIGS. 8~12 show a second embodiment of the present invention.

Figure 10:
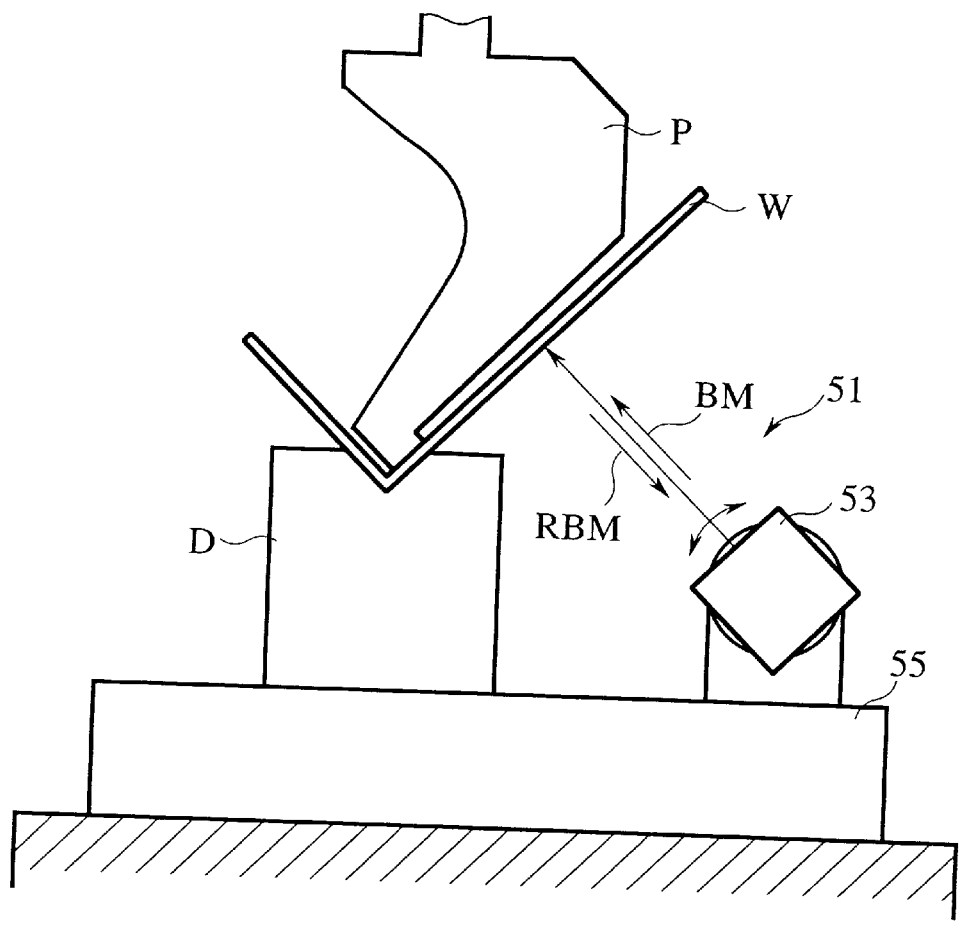
FIG. 10 is a side view showing the structure and operation of a sensor head.

In FIG. 10, a sensor head 53 of an angle detection apparatus 51 is provided on top of a die base 55 for mounting a die D which carries out a bending process on a workpiece W which is the measurement object, in cooperation with a punch P. The sensor head 53 is provided so that by means of rotational drive of a motor M described below (see FIG. 8), it is freely rotatable around a rotation axis RC (see FIG. 11) which is parallel to the lengthwise direction of the die D and punch P, namely, the bending line of the workpiece W. Further, the sensor head 53 is provided so as to be freely movable in the bending line direction (the direction normal to the plane of FIG. 10) by means of a moving device (omitted from the drawings).

Figure 8:
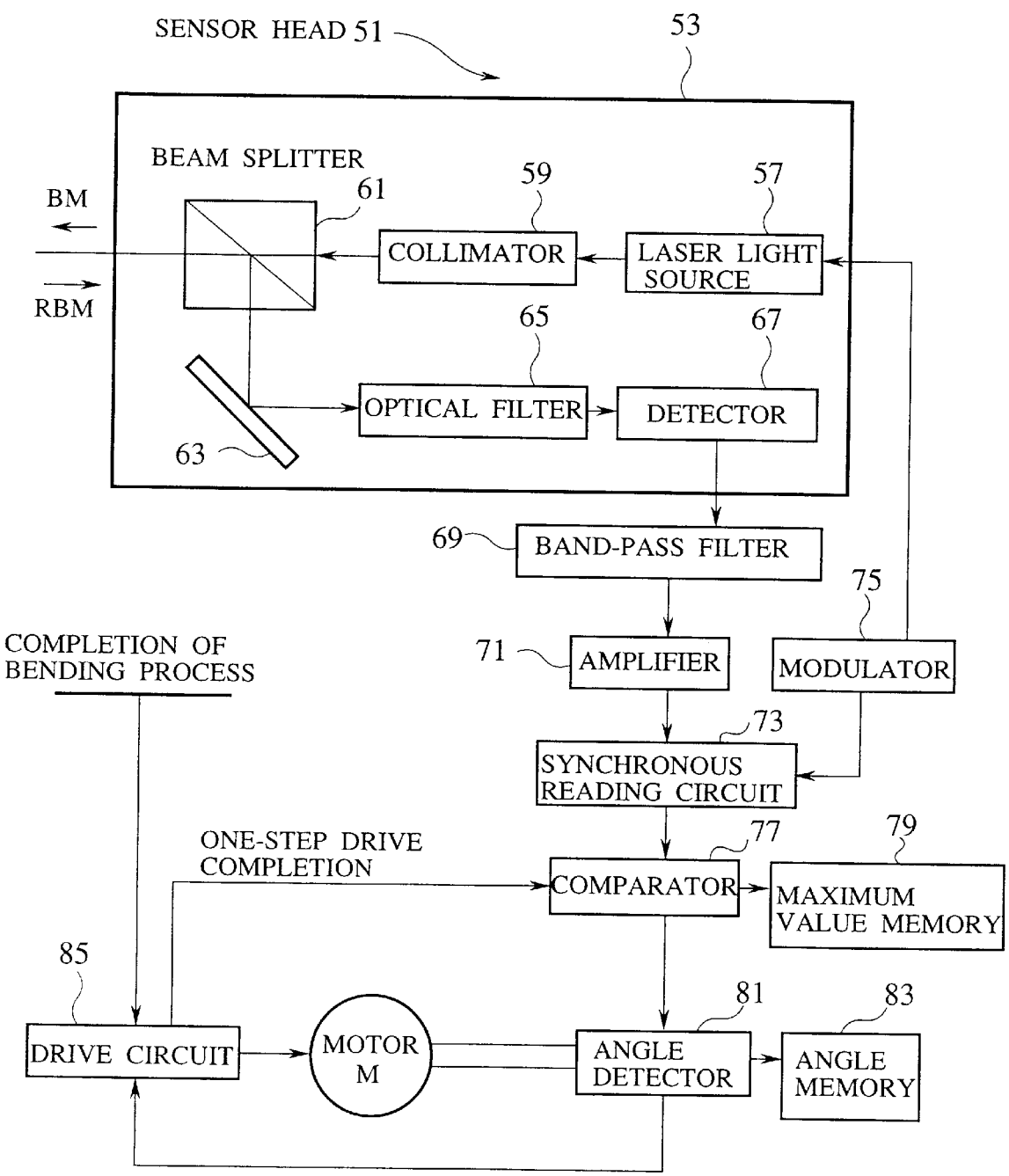
FIG. 8 is a block diagram showing the angle detection apparatus for bending machines according to this invention.

With reference to FIG. 8 as well as the foregoing, in the sensor head 53, a laser beam BM emitted from a light source 57 is formed into parallel rays of light by a collimator 59, which are then passed through a beam splitter 61 and aimed as detection light at a workpiece W which is the measurement object.

The light reflecting off the workpiece W forms a reflected light beam RBM the direction of which is changed by a beam splitter 61 and then by a reflection mirror 63; then, only the light which is in a prescribed range is selected and converted into electrical signals by an optical filter 65 and a detector 67 such as a photodiode as an optical sensor. The electrical signals are then sent out as received light signals.

From the received light signals obtained in this way, only those signals that have a prescribed frequency width will be passed through by a band pass filter 69, amplified by an amplifier 71 and then inputted into a synchronous read circuit 73, where they are designed to be synchronized with emission signals of the laser beam BM from the light source 57 sent in via a modulator 75.

The received light signals synchronized by the synchronous read circuit 73 with the emission of the laser beam BM are sent to a comparator 77 to select the maximum received light signal, which is then stored in a maximum value memory 59 forming a maximum received light quantity detection portion and sent to a rotation angle detector 81 such as an encoder provided in a servo motor M for rotating the sensor head 53, and then the rotation angle of the sensor head 53 at this time is detected and stored in an angle memory 83 which is a maximum received light quantity angle detection portion as well as an angle calculation portion.

That is to say, when a drive circuit 85 receives a signal indicating the completion of the bending process from a control device which controls the press brake, the motor M is controlled and a one-step drive is carried out by rotating the sensor head 53 by a prescribed rotation angle. And at the same time a one-step drive completion signal is sent to the comparator 77 wherein the received light signal at this time is compared with the previous received light signal in synchronism with the rotation angle of the sensor head 53, whereby the maximum received light signal is stored in the maximum value memory 79, and the rotation angle of the sensor head 53 in stored in the angle memory 83.

Next, with reference to FIG. 11, a description will be given for the principle of detecting the bending angle 2 $\theta$ of the workpiece W.

When a laser beam BM which forms detection light is aimed at a workpiece W which has been subjected to a bending process, the amount of reflected light received by the sensor head 53 will change in accordance with the incidence angle with respect to the surface of the workpiece W. From this fact, after the completion of the bending process of the workpiece W, the laser beam is aimed at the workpiece W while the sensor head 53 is rotated within a range $\pm\alpha$ (here, $\alpha$ lies in a range of about 5~10 degrees, for example) with respect to the target bending angle $\theta$ to determine the distribution of the quantity of light received by the sensor head 53.

Figure 11:
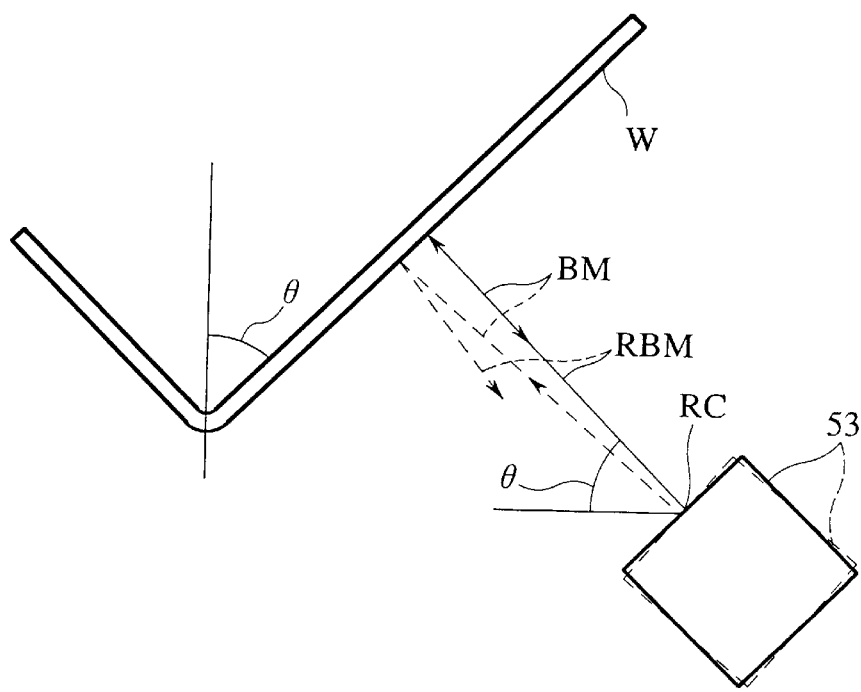
FIG. 11 is an explanatory drawing showing the principle of the angle detection method for bending machines and the angle detection apparatus thereof.

As is made clear with reference to FIG. 11, in the case where the laser beam BM emitted from the sensor head 53 is perpendicular to the surface of the workpiece W, the reflected light beam RBM follows the same path and is received by the sensor head 53.

Figure 12:
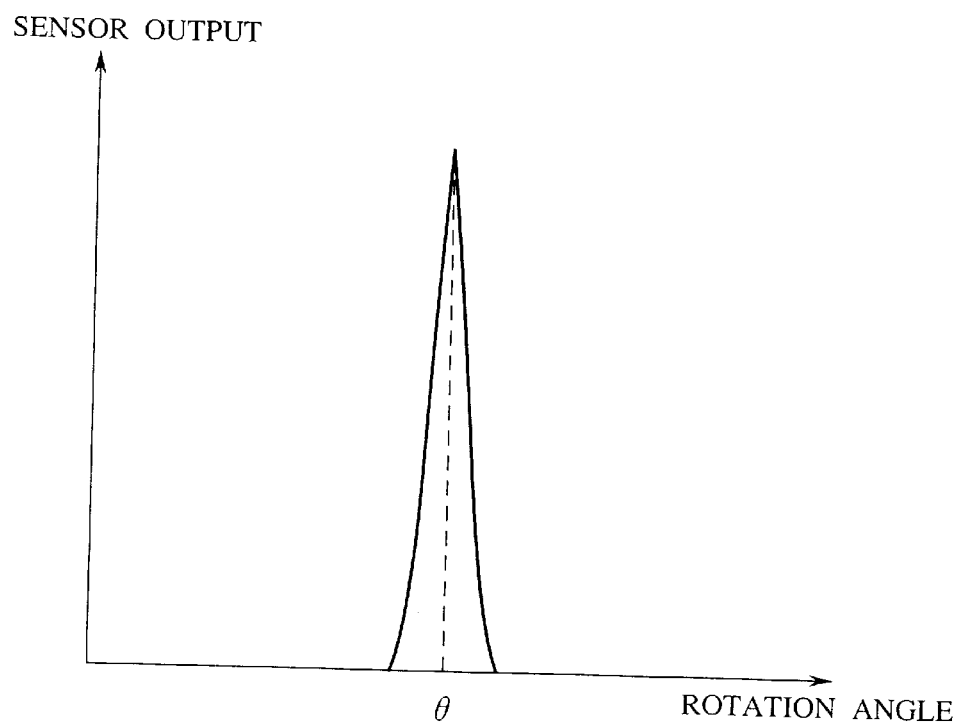
FIG. 12 is a graph showing the changes in the quantity of light received for the rotation angles of the sensor head.
Figure 13:
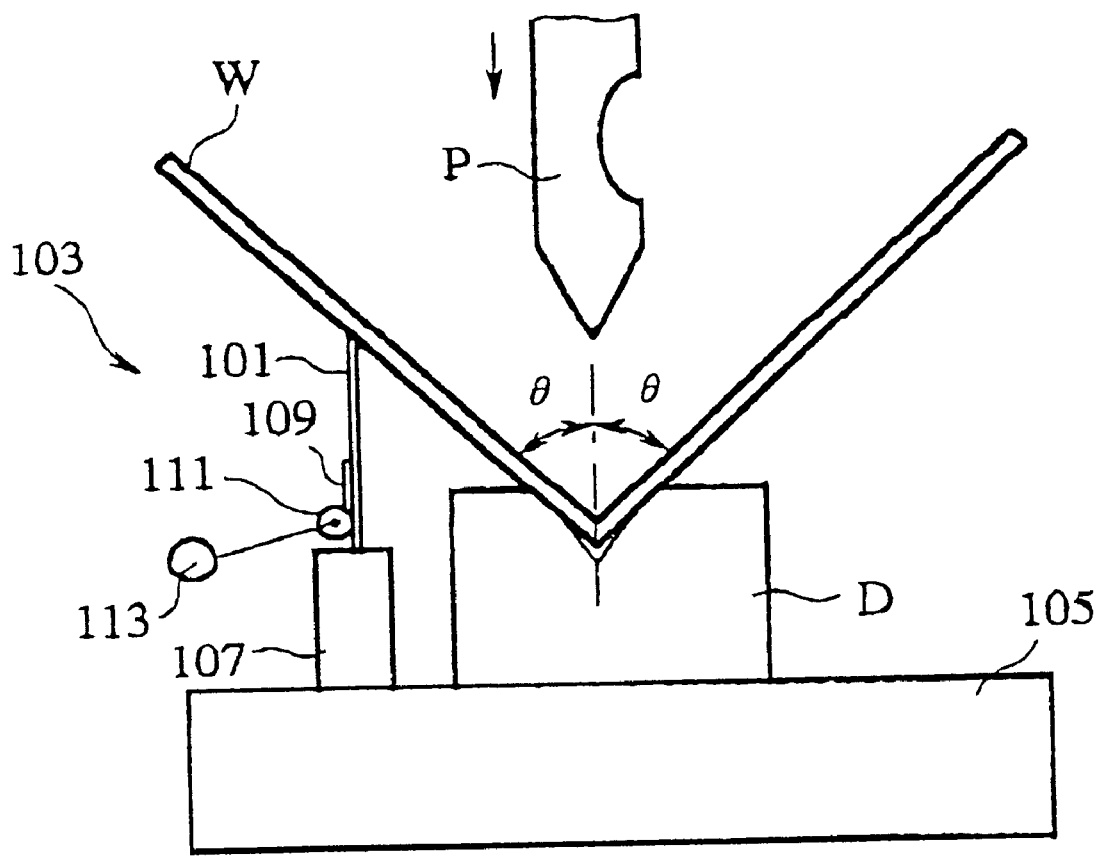
FIG. 13 is an explanatory drawing showing a prior art angle detection method for bending machines and the angle detection apparatus thereof.

With a combined reference to FIG. 12, in the distribution of the quantity of received light determined as described above, it is known that a maximum peak is obtained when the laser beam BM is aimed perpendicular at the workpiece W. Accordingly, the rotation angle of the sensor head 53 corresponding to the maximum peak can be determined, and based on this rotation angle it becomes possible to detect the bending angle $\theta$ of the workpiece W. At this point, it need not be said that the bending angle is actually 2 times $\theta$.

Figure 9:
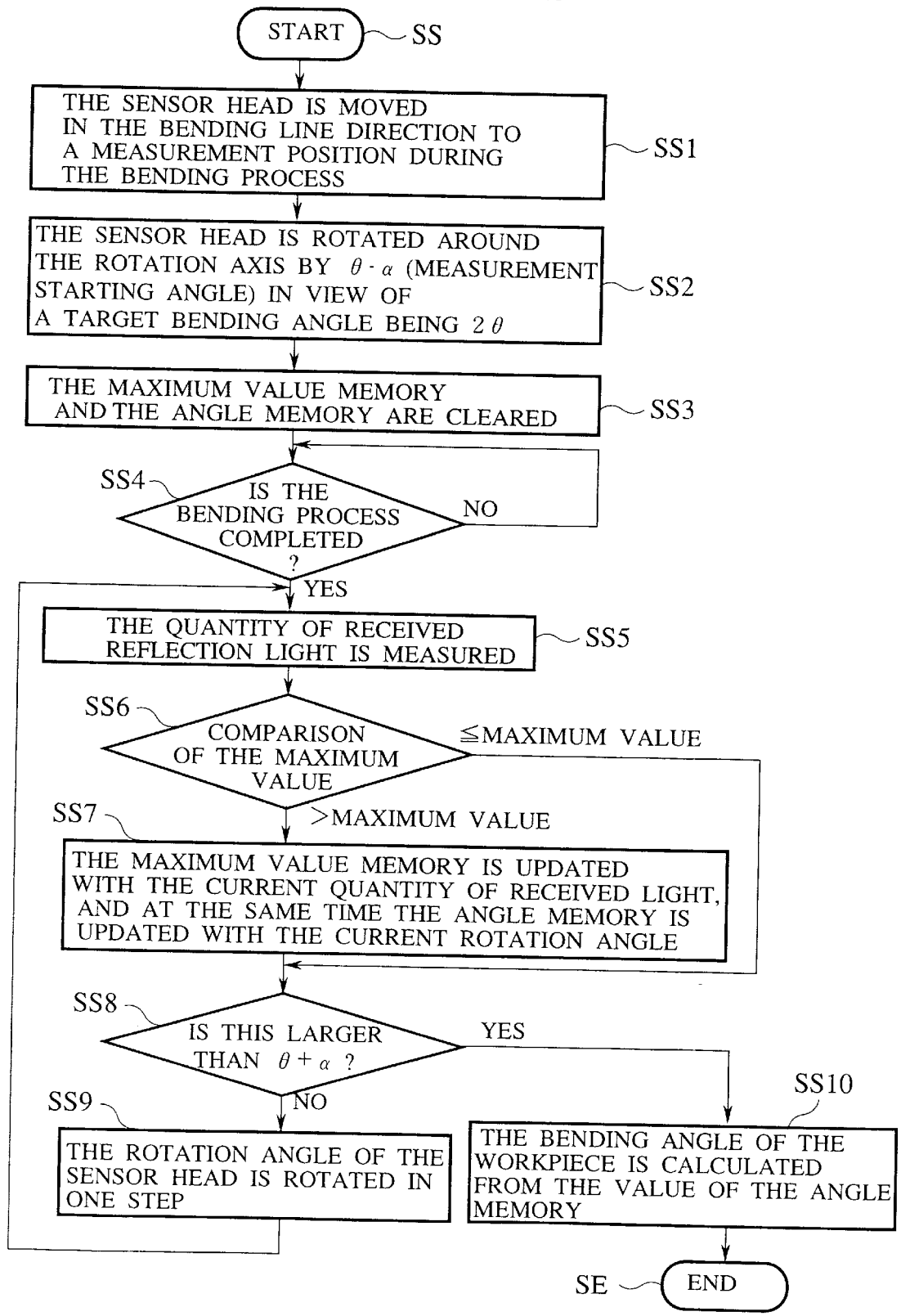
FIG. 9 is a flow chart showing the steps of an angle detection method for bending machines according to this invention.

Next, based on FIG. 9, a description will be given for a method of determining the bending angle of a workpiece W using the angle detection apparatus 51 for bending machines described above.

When the angle detection operation is started (Step SS), during the bending process, the sensor head 53 is moved along a direction parallel to the bending line to a measuring position (Step SS1). In view of a target bending angle of 2 $\theta$, the motor M rotates the sensor head 53 by $\theta-\alpha$ to prepare for the start of measurements (Step SS2). Further, the maximum value memory 79 and the angle memory 83 are cleared to zero (Step SS3).

A judgement as to whether or not the bending process has been completed is carried out (Step SS4), and if judged completed, the program proceeds to measurements. The reflected light beam RBM of the laser beam BM emitted toward the workpiece W from the sensor head 53 is received, and the quantity of received light is measured (Step SS5). The measured quantity of received light is then compared with the maximum value up to that point (Step SS6), and in the case where the measured quantity of received light is larger than the maximum value up to that point, the maximum value memory 79 is updated with the current detected quantity of received light, and at the same time the angle memory 83 is updated with the current rotation angle of the sensor head 53 (Step SS7).

On the other hand, in the case where at Step SS6 the measured quantity of received light is not larger than the maximum value up to that point, or after updating the maximum value at Step SS7, the rotation angle of the sensor head 53 is judged whether it is equal to $\theta+\alpha$ (Step SS8) and if it is smaller than $\theta+\alpha$, the sensor head 53 undergoes a one-step rotation and the program returns to Step SS5, with the steps from there being repeated (Step SS9).

In the case where the rotation angle of the sensor head 53 reaches $\theta+\alpha$, the bending angle $2\theta$ of the workpiece W is calculated from the rotation angle stored in the angle memory 83 (Step SS10), and then the angle detection operation is terminated (Step SE).

Now, in the embodiment described above, although the sensor head 53 was provided on top of the die base 55 so as to be movable in the direction of the bending line and rotatable, it is also possible to mount the sensor head 53 on the bed of the press brake so as to be movable in the up and down direction and the front and back direction. In this way, it is possible to measure a wider range of bending angles.

Further, in another method, all the measured values are stored, and then after the measurements have been completed, the stored data is separately plotted on a curve, with the maximum quantity of received light obtained from this curve being used to calculate the corresponding angle. In this method, an angle measurement at an accuracy below the measured rotational angle of the sensor head 53 is possible. Further, in the present invention, although measurements were carried out under pressing conditions by means of the punch and die, the conditions under which measurements are carried out are not limited to this condition.

Furthermore, in the case where the reflectance is small due to surface conditions of the workpiece, it is possible to obtain a good reflectance by carrying out an appropriate process such as applying an appropriate reflecting tape for example, and it becomes possible to execute the present invention regardless of the effects of surface conditions of the workpiece.

The present invention is not limited to the embodiment described above, and by carrying out appropriate modifications, the present invention can be executed in other ways. For example, it is possible to form a structure which uses a transmitter to transmit appropriate electromagnetic waves or ultrasound waves and a receiver in place of the light projector and light receiver.

Figure 1:
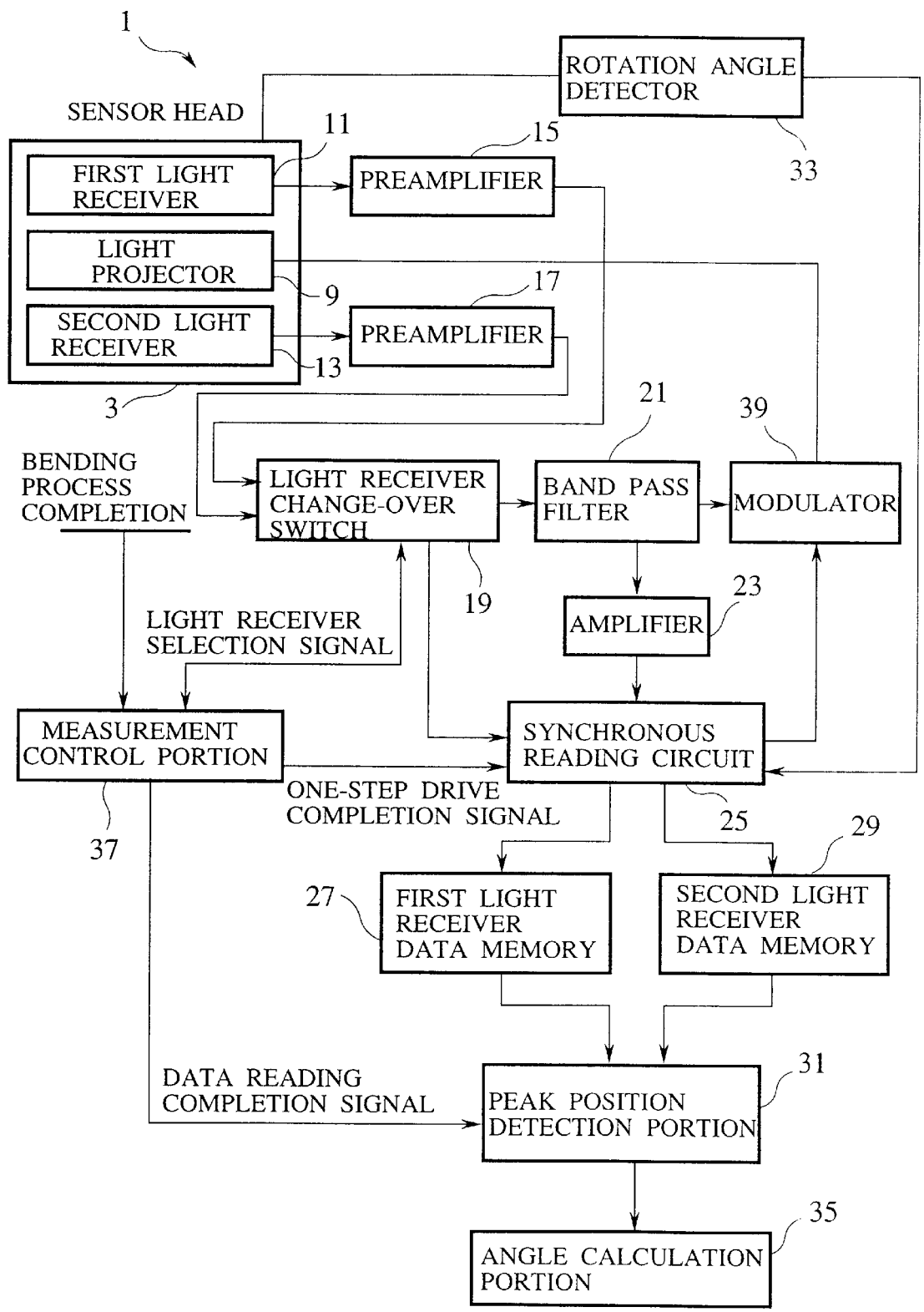
FIG. 1 is a block diagram showing an angle detection apparatus for bending machines according to this invention.
Figure 2:
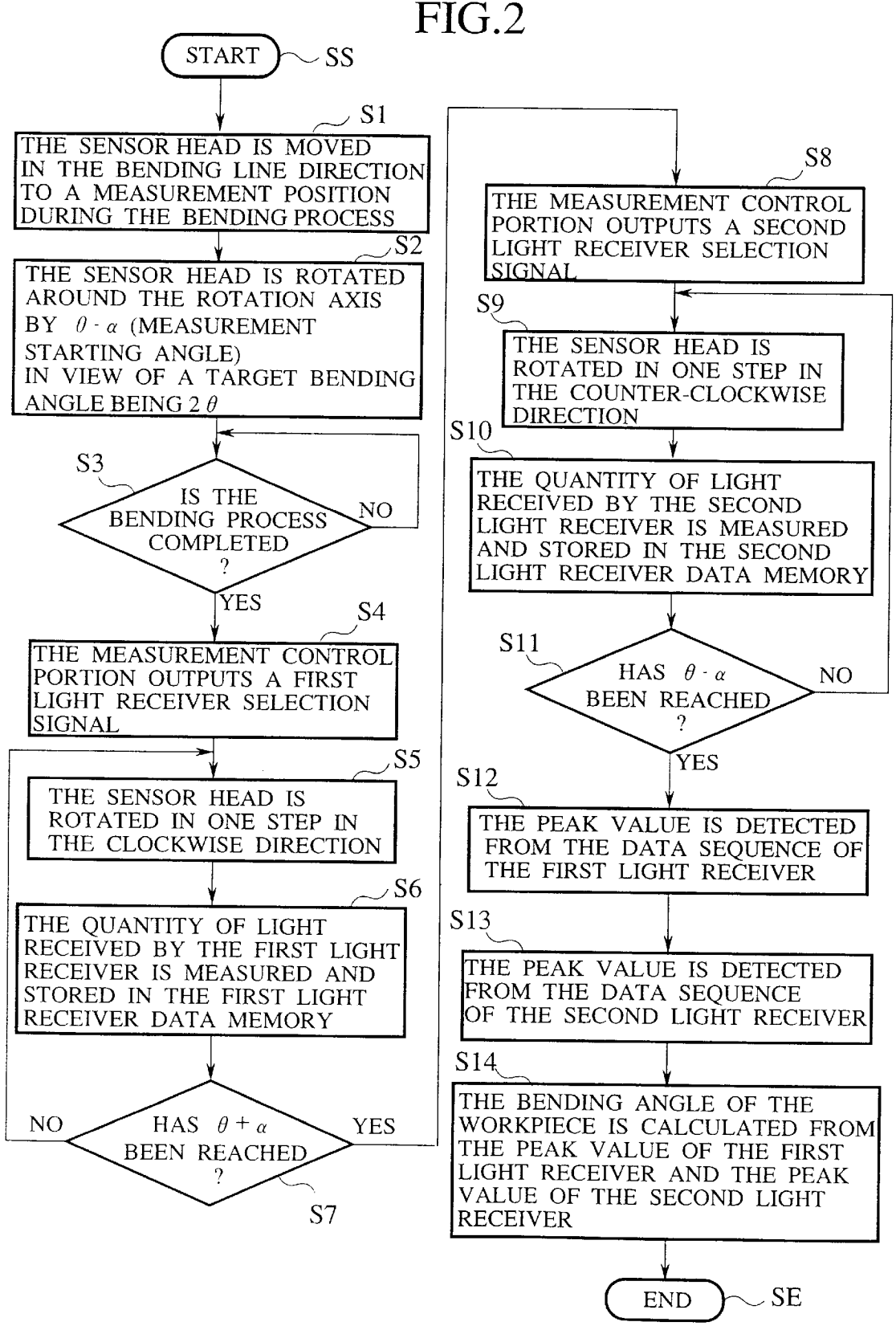
FIG. 2 is a flow chart showing the steps of an angle detection method for bending machines according to this invention.

In this case, the apparatuses shown in FIGS. 1 and 8 are modified to replace the structure related to the optical system with a structure corresponding to electromagnetic waves or ultrasound waves, in which the angle detection apparatus includes an angle sensor equipped with a transmission source for emitting detection waves toward a measurement object and a plurality of sensors for receiving reflected waves from the measurement object, the sensors being located at mutually opposite positions with the transmission source arranged therebetween, and the angle sensor being rotatable in forward and reverse directions in the plane where the transmission source and each of the sensors are arranged; a rotation angle detector for detecting the rotation angle of the angle sensor with respect to a prescribed reference position; a peak value detection portion for detecting the peak value of the reflected wave received by the optical sensors; and an angle calculation portion for calculating the angle of the measurement object based on the rotation angle of the angle sensor detected by the rotation angle detector which should correspond to the peak value detected by the peak value detecting portion.

Further, it is possible to construct an angle detection apparatus which includes an angle sensor equipped with a transmission source for emitting detection waves toward a measurement object and at least one pair of sensors for receiving reflected waves from the measurement object, the pair of sensors being located at symmetrical positions with the transmission source arranged in the center, and the angle sensor being rotatable in forward and reverse directions in the plane where the transmission source and each of the sensors are arranged; a rotation angle detector for detecting the rotation angle of the angle sensor with respect to a prescribed reference position; and an angle calculation portion for calculating the angle of the measurement object based on the rotation angle of the angle sensor detected by the rotation angle detector when the intensities of the reflected waves received by each of the pair of sensors are equal to each other.

Further, it is also possible to construct an angle detection apparatus which includes an angle sensor equipped with a transmission source for emitting detection waves toward a detection object and sensors for receiving reflected waves from the detection object, the angle sensor being rotatable around a rotation axis which is parallel to the bending line of the detection object; a rotation angle detector for detecting the rotation angle of the angle sensor with respect to a prescribed reference position; a peak value detection portion for detecting the peak value of the reflected wave received by the sensors; an angle detection portion for detecting the rotation angle of the angle sensor when the peak value is obtained by the peak value detection portion; and an angle calculation portion for calculating the angle of the detection object from the rotation angle obtained by the angle detection portion.

Also, in the angle sensor equipped with a transmission source for impinging detection waves onto the measurement object and sensors for receiving the reflected waves from the measurement object, such structure can be equipped with a plurality of sensors arranged at mutually opposite positions with the transmission source therebetween.

APPLICABILITY TO INDUSTRY

As described above, in the angle detection method for bending machines according to the invention of claim 1, detection light emitted from the light source of the rotating angle sensor strikes the measurement object and the reflected light therefrom is received by optical sensors positioned at mutually opposite positions in the angle sensor with the light source therebetween, and the angle of the measurement object is measured from the rotation angles of the angle sensor at the positions where the quantity of light received by each of the optical sensors forms a peak.

Namely, because angle detection is carried out by a non-contact type angle sensor, there is no risk of external forces deforming the workpiece as in the prior art, and this makes it possible to carry out a highly accurate angle detection. Further, because there is no need for expensive devices such as imaging devices, the entire apparatus can be constructed at a low cost.

In the angle detection method for bending machines according to the invention of claim 2, detection light emitted from the light source of the rotating angle sensor strikes the measurement object and the reflected light therefrom is received by a pair of optical sensors symmetrically positioned in the angle sensor at equally distances from the light source, and the angle of the measurement object is measured from the rotation angle of the angle sensor at the time when the quantities of light received by the pair of optical sensors are the same as each other. Namely, because angle detection is carried out by a non-contact type angle sensor, there is no risk of external forces deforming the workpiece as in the prior art, and this makes it possible to carry out a highly accurate angle detection. Further, because there is no need for expensive devices such as imaging devices, the entire apparatus can be constructed at a low cost.

In the angle detection apparatus for bending machines according to the invention of claim 3, detection light is directed onto the measurement object from a light source while an angle sensor is rotated in the forward and reverse directions, and the light reflected from the measurement object is received by a plurality of optical sensors provided at mutually opposite positions with the light source arranged therebetween. The quantity of light received at this time is synchronized with the rotation angle of the angle sensor detected by the rotation angle detector and held for future use, and based on the data of this quantity of received light, the peak value detection portion detects the peak value of the quantity of received light, and because an angle detector determines the angle of the measurement object by calculations based on the rotation angles of the angle sensor corresponding to the peak values for each optical sensor, there is no risk of deformation of the workpiece due to direct or indirect contact as in the prior art, and this makes it possible to carry out a highly accurate angle detection. Further, because there is no need for expensive devices such as imaging devices, the entire apparatus can be constructed at a low cost.

In the angle detection apparatus for bending machines according to the invention of claim 4, detection light is directed onto the measurement object from a light source while an angle sensor is rotated in the forward and reverse directions, and the light reflected from the measurement object is received by at least one pair of optical sensors provided at symmetrical positions with respect to the light source, with a rotation angle detector detecting the rotation angle of the angle sensor at the time when the quantities of light received by the pair of optical sensors are the same as each other, and because an angle calculation portion detects the angle of the measurement object based on this rotation angle, there is no risk of deformation of the workpiece due to direct or indirect contact as in the prior art, and this makes it possible to carry out a highly accurate angle detection. Further, because there is no need for expensive devices such as imaging devices, the entire apparatus can be constructed at a low cost.

In the invention according to claim 5, because the angle sensor of the angle detection apparatus stated in claim 3 or 4 is provided so as to be position adjustable in a direction orthogonal to the bending line of the measurement object, the angle sensor can be positioned at an optimum position with respect to the final bending angle of the measurement object (workpiece), and this makes it possible to obtain good accuracy for various bending angles.

In the invention according to claim 6, because the angle sensor of the angle detection apparatus stated in claim 3, 4 or 5 is provided so as to be position adjustable in a direction parallel to the bending line of the measurement object, it becomes possible for the angle sensor to easily carry out detection of the bending angle for a plurality of locations such as both left and right edge portions and the center portion of the measurement object.

In the invention according to claim 7, because an angle sensor is equipped with a light source for emitting detection light toward a measurement object and a plurality of optical sensors for receiving reflected light from the measurement object, with the optical sensors being located at mutually opposite positions with the light source arranged therebetween, it is possible to simultaneously detect the reflected light of the detection light directed onto the measurement object from the light source with the plurality of optical sensors, and in the case where the angle sensor is rotated in the forward and reverse directions, it becomes possible to separately detect the peak value of each of optical sensors.

In the angle detection method for bending machines according to the invention of claim 8, detection light from a light source of a rotating angle sensor is emitted toward a detection object, while at the same time reflected light from the detection object is received along the same axis, and because the angle of the detection object is calculated from the rotation angle of the angle sensor when the quantity of received light forms a maximum, it is possible to carry out angle detection with a non-contact type angle sensor, thereby eliminating the risk of external forces deforming the workpiece as in the prior art, and because there is also no risk of the adjustment state changing over time, this apparatus makes it possible to carry out a highly accurate angle detection. Further, because there is no need for expensive devices such as imaging devices, the entire apparatus can be constructed at a low cost.

In the angle detection apparatus for bending machines according to the invention of claim 9, detection light from a light source is directed onto a detection object while an angle sensor is being rotated, and at the same time an optical sensor positioned on the same axis receives reflected light from the detection object. The maximum of this quantity of received light is detected by a maximum received light detection portion, and when the maximum received light is detected the rotation angle of the angle sensor at that time is detected by a rotation angle detector, and because an angle calculation portion determines the angle of the detection object by calculations based on the obtained rotation angle of the angle sensor, there is no risk of deformation of the workpiece due to direct or indirect contact as in the prior art, and because there is also no risk of the adjustment state of the sensor itself changing over time, this apparatus makes it possible to carry out a highly accurate angle detection. Further, because there is no need for expensive devices such as imaging devices, the entire apparatus can be constructed at a low cost.

What is claimed is:

1. An angle detection method for bending machines, comprising the steps of emitting detection light toward a measurement object from a light source provided in an angle sensor equipped with a plurality of optical sensors arranged at mutually opposite positions with the light source therebetween, rotating the angle sensor in the forward and reverse directions within the plane where the light source and optical sensors are arranged, and detecting the angle of the measurement object based on the rotation angle of the angle sensor at the time when the quantity of light received by one of the optical sensors is a maximum and the rotation angle of the angle sensor at the time when the quantity of light received by the other optical sensor is a maximum.

2. An angle detection method for use in bending machines, comprising:
  emitting detection light toward a measurement object from a light source provided in an angle sensor equipped with at least one pair of optical sensors arranged at substantially symmetrical positions with the light source substantially centered therebetween;
  rotating the angle sensor in forward and reverse directions within a plane where the light source and optical sensors are arranged;
  detecting peak values of reflected light received by the respective optical sensors; and
  detecting an angle of the measurement object based on the rotation angle of the angle sensor from a reference position when the quantities of light received by the pair of optical sensors are substantially the same.

3. An angle detection apparatus, comprising;
  an angle sensor equipped with a light source for emitting detection light toward a measurement object and at least one pair of sensors for receiving reflected light from the measurement object, said pair of sensors being located at symmetrical positions with the light source arranged in the center, and said angle sensor being rotatable in forward and reverse directions in a plane where the light source and each of said sensors are arranged;
  a peak value detection portion for detecting peak values of the reflected light respectively received by said optical sensors;
  a rotation angle detector for detecting the rotation angle of the angle sensor with respect to a prescribed reference position; and
  an angle calculation portion for calculating the angle of the measurement object based on the rotation angle of the angle sensor detected by the rotation angle detector when the quantity of the reflected light received by each of the pair of sensors are equal to each other.

4. An angle detection apparatus, comprising an angle sensor equipped with a light source for emitting detection light toward a measurement object and a plurality of optical sensors for receiving reflected light from the measurement object, the optical sensors being located at mutually opposite positions with the light source arranged therebetween, and the angle sensor being rotatable in forward and reverse directions in the plane where the light source and the optical sensors are arranged; a rotation angle detector for detecting the rotation angle of the angle sensor with respect to a prescribed reference position; a peak value detection portion for detecting the peak values of the reflected light received by the optical sensors; and an angle calculation portion for calculating the angle of the measurement object based on those rotation angle of the angle sensor detected by the rotation angle detector which correspond to the peak values detected by the peak value detection portion.

5. The angle detection apparatus as stated in claim , wherein the angle sensor is provided so as to be position adjustable in a direction orthogonal to the bending line of the measurement object.

6. The angle detection apparatus as stated in claim 4, wherein the angle sensor is provided so as to be position adjustable in a direction parallel to the bending line of the measurement object.

7. An angle sensor, comprising:
  a light source for emitting detection light toward a measurement object;
  a plurality of optical sensors for receiving reflected light from the measurement object, said optical sensors being located at mutually opposite positions with said light source arranged therebetween, said optical sensors and said light source being configured to collectively rotate about a common axis; and
  a peak value detection portion for detecting peak values of the reflected light respectively received by said optical sensors.

8. The angle sensor according to claim 7, further comprising a rotating angle detector that detects a rotation angle of the sensor with respect to a predetermined reference position.

9. An angle detection method for bending machines, comprising emitting detection light toward a detection object from a light source provided in an angle sensor, the angle sensor simultaneously emitting detection light and receiving reflected light on plurality of optical sensors; rotating the angle sensor around a rotation axis parallel to a bending line of the detection object; calculating the maximum quantity of received light of the reflected light from the detection object and a rotation angle of the angle sensor at a predetermined time; and detecting the angle of the detection object from the rotation angle at the predetermined time.

10. The angle detection bending method according to claim 9, wherein the plurality of optical sensors are located at mutually opposite positions with the light source therebetween.

11. An angle detection apparatus, comprising an angle sensor equipped with a light source for emitting detection light toward a detection object and a plurality of optical sensors for receiving reflected light from the detection object, the angle sensor being rotatable around a rotation axis parallel to a bending line of the detection object; a rotation angle detector for detecting the rotation angle of the angle sensor with respect to a prescribed reference position; a maximum received light quantity detection system that detects the maximum received light quantity of the reflected light received by said plurality of optical sensors; a maximum received light quantity angle detection portion for detecting the rotation angle of the angle sensor at the time when the maximum received light quantity is obtained by the maximum received light quantity detection system; and an angle calculation system that calculates the angle of the detection object from the rotation angle obtained by the maximum received light quantity angle detection system.

12. The angle detection apparatus according to claim 11, wherein said plurality of optical sensors are located at mutually opposite positions with the light source therebetween.

* * * * *

UNITED STATES PATENT AND TRADEMARK OFFICE
CERTIFICATE OF CORRECTION

PATENT NO.    : 6,268,912 B1          Page 1 of 1
DATED         : July 31, 2001
INVENTOR(S)   : G. Brinkman et al.

It is certified that error appears in the above-identified patent and that said Letters Patent is hereby corrected as shown below:

Column 16,
Line 1, after "claim" insert -- 4 --.

Signed and Sealed this

Seventeenth Day of December, 2002

JAMES E. ROGAN
*Director of the United States Patent and Trademark Office*